Sept. 5, 1967 G. R. ARCHER 3,340,461
SERVO SYSTEM SIGNAL GENERATOR
Filed April 5, 1963 2 Sheets-Sheet 1
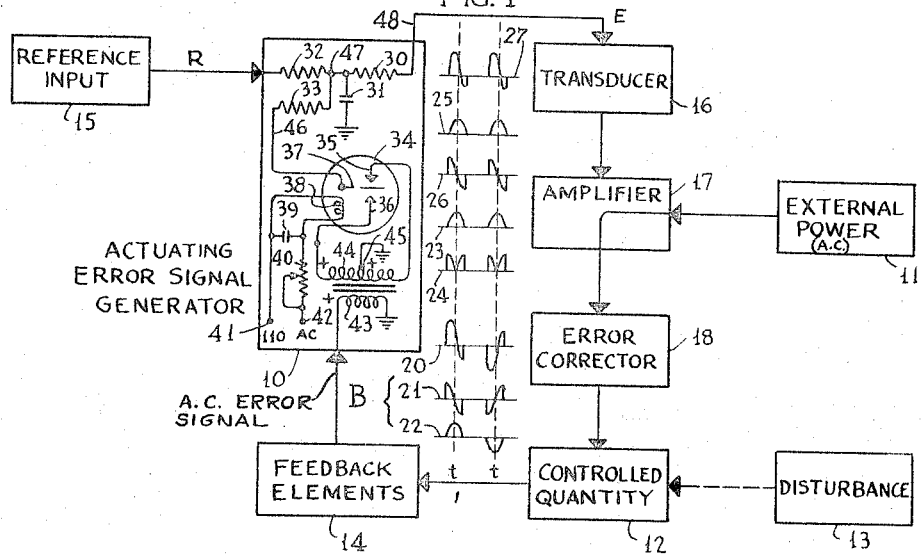
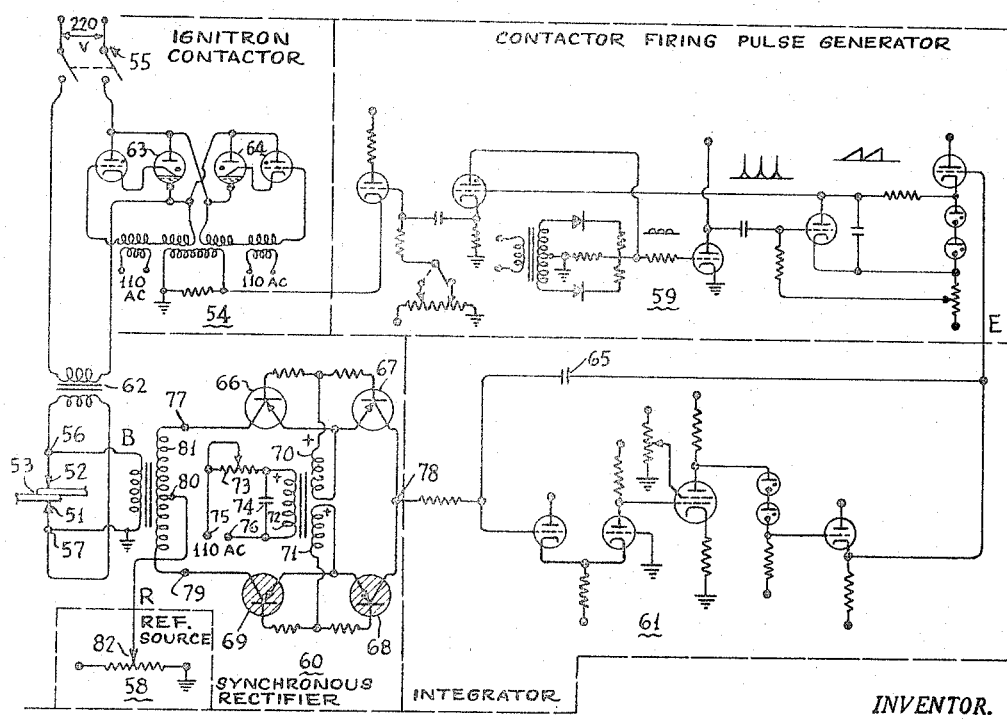
INVENTOR.
George R. Archer
BY
Woodhams, Blanchard and Flynn
ATTORNEY

United States Patent Office 3,340,461
Patented Sept. 5, 1967

3,340,461
SERVO SYSTEM SIGNAL GENERATOR
George R. Archer, Whitman, Mass., assignor to Robotron Corporation, Detroit, Mich., a corporation of Michigan
Filed Apr. 5, 1963, Ser. No. 270,940
5 Claims. (Cl. 323—25)

This application is a continuation-in-part of Ser. No. 3,779, filed Jan. 21, 1960, now Patent No. 3,094,608, issued June 18, 1963.

This invention pertains to circuits for the generation of servo system signals, and more particularly to the generation of error correction signals proportional to the time integral of the difference between a reference signal and a feedback signal.

A servo or closed-loop regulator system acts on a controlled quantity subjected to external disturbances and functions to equate a condition of that quantity to a desired reference condition. Typically, a servo system includes: (1) a means supplying a reference signal equivalent to the desired condition that the servo is required to hold; (2) a means supplying a feedback signal equivalent to the actual condition of the controlled quantity; (3) a means generating an error correction signal proportional to a function of error (difference) between the feedback and reference signals; (4) a means actuated by the error correction signal altering the level of the controlled quantity.

In many practical servo system applications, the power input is from an alternating current source and the potential drop (voltage) across a resistance is the signal fed back as directly proportional to some physical or thermal condition. This feedback voltage signal is developed by an electric current traversing a resistive parameter of the controlled quantity. However, the voltage across a resistor varies not only with resistance but also with inductive effects according to the rate of change of current through the distributed inductance which is necessarily a part of any real circuit. These inductive voltage effects must be eliminated before a usable error correction signal can be attained from the feedback signal. Because it is not generally practicable for the reference signal to be an alternating voltage, alternating feedback voltage signals must be rectified before difference error comparison is accomplished. Further, to prevent perpetuity of error due to continuous disturbance, the error correction signal is preferably an integral function of the comparison error.

Because of the undesirable inductive effects, it has been usually necessary to resort to a sampled data system whereby the feedback signal is sampled coincidentally with current maxima, when the rate of change of current through the controlled quantity circuit is nil. The periods of these maxima are infinitesimal, however, and their phase relationship is inconstant.

As a specific example of the generic problems outlined above, reference may be had to the copending application of George R. Archer, Ser. No. 756,397, filed Aug. 21, 1958, now Patent No. 3,068,350, issued December 11, 1962. There is shown therein a resistance heating control system which assures attainment of a desired temperature condition at the workpiece interface (e.g. that of weld nugget fusion) by a monitoring and constraint of the voltage developed across a workpiece in a resistance heating circuit. While that system is extremely advantageous, it includes complex and expensive sampling circuits for generation of the error correction signals. With even the most rigorous design precautions, those circuits are still somewhat liable to inaccuracies due to the above-mentioned sampling difficulties.

Therefore, it is a general object of this invention to provide improved signal generator circuits for generating servo system error correction signals which obviates undesirable inductive voltage effects superimposed upon controlled quantity condition indicating resistive voltages.

Another general object is to provide, for alternating current servo systems, improved signal generator circuits yielding error correction signals which, during the entirety of ultilization periods therefore, are an integral function of the difference between a reference signal voltage and a feedback signal resistive voltage component without interference from the feedback signal inductive voltage components.

The servo system error signal is achieved by the synchronous rectification of the total feedback signal followed by integration thereof with respect to time to accumulate the absolute magnitude of the resistive voltage signal component, whereby undesirable inductive voltage signal components are eliminated. An illustrated embodiment of a preferred error correction signal generator circuit of this invention comprises an input transformer having a primary for connection in parallel with a workpiece resistance and a center-tapped secondary, a double-pole double-throw switch having an output terminal and two input terminals connected with opposite ends of the transformer secondary, and an integrator coupled with the output terminal of the switch.

While this invention is particularly pointed out and distinctly claimed in the claims appended to the specification, a better understanding thereof, together with additional objects and advantages will be had upon consideration of the following description and the accompanying drawings, wherein:

FIGURE 1 is a block diagram illustrating, schematically, the servo system signal generation circuits of this invention in conjunction of a generalized closed-loop system;

FIGURE 2 illustrates a preferred servo system signal generator circuit as applied in a resistance heating control;

Figure 3:
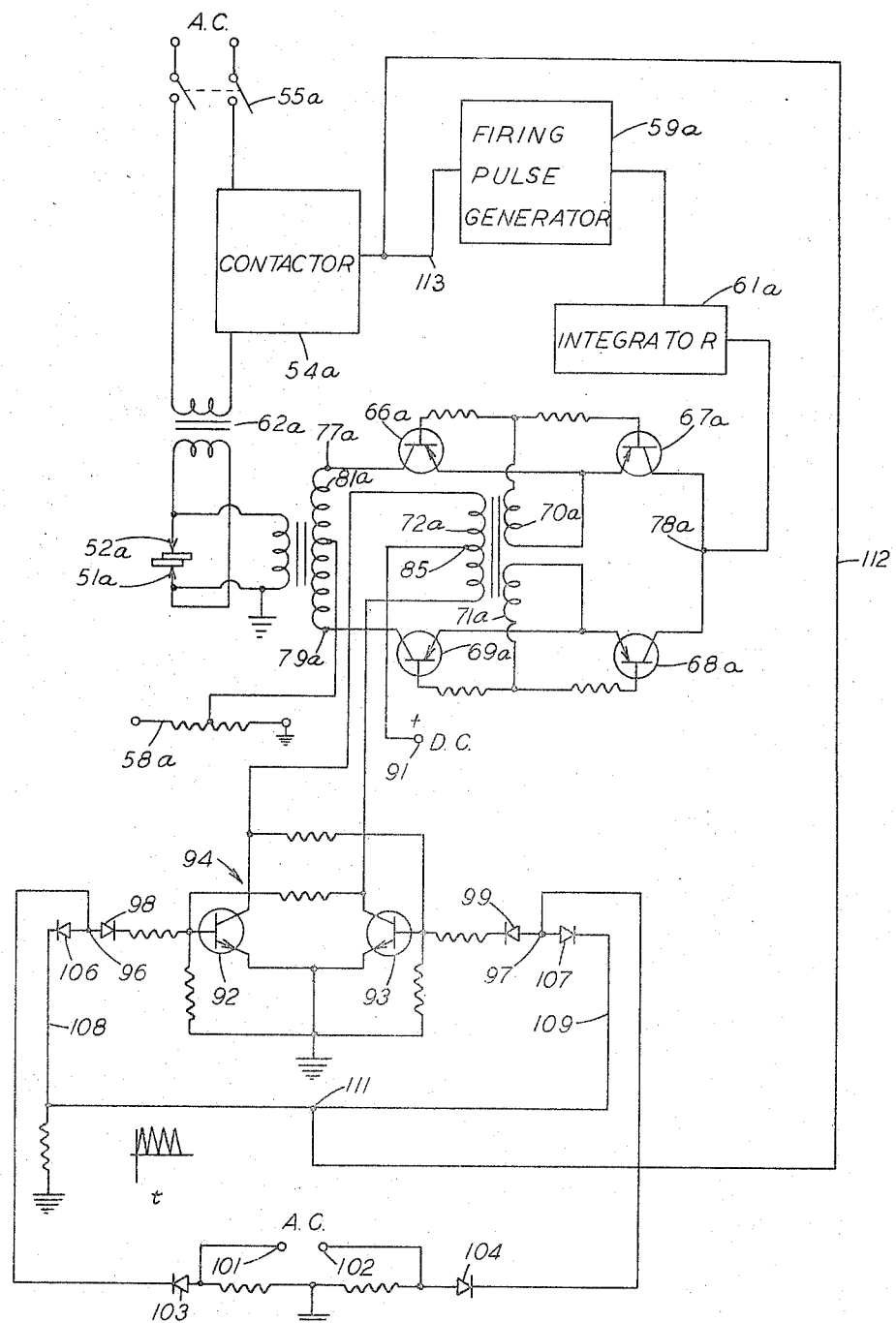
FIGURE 3 illustrates another preferred embodiment of the invention.

With particular reference to FIGURE 1, the error correction signal generator 10 of this invention is illustrated in operational relationship with functional elements of a generalized servo system. This system is required to control the delivery of energy from an alternating power source 11 so as to maintain a predetermined level of condition of the controlled quantity at 12, regardless of disturbing influences from independent sources indicated at 13. Condition of the controlled quantity at 12 is sensed by feedback elements 14 which supply a feedback signal B. The reference signal generator 15 generates a reference signal R according to an extrinsic command. The level of reference signal R is selected to equal the level of the feedback signal B when the latter corresponds to the desired condition of the controlled quantity at 12.

The error correction signal generator 10 sets up a comparison (R–B) and generates an error correction signal E according to any difference in the comparison. Transducer 16 harmonizes the error correction signal E with the input parameters of amplifier 17. The latter responds to alter the power input delivered to error corrector 18 which acts on the controlled quantity at 12.

When power is developed by an alternating current power source and a resistive condition of the controlled quantity is monitored, as here, the feedback signal B is a composite signal, diagrammed at 20 comprising an inductive voltage component 21 and a resistive voltage component 22. It is the resistive voltage component 22 which is informative of the resistive parameter of the controlled quantity at 12. Each of these voltage wave forms exhibits the characteristic discontinuous, alternate polarity, segments which correspond in time to the portions of the alternate half-cycles of the power source when current is traversing the controlled quantity.

Heretofore, the composite signal 20 was sampled at times $t$ coincident with the inductive voltage inflections when the resistive voltage component 22, only, is present in the total feedback signal B. According to this invention, however, the difficult sampling procedure is avoided by a unique step designated as synchronous rectification. By way of explanation, conventional rectification of the feedback signal would result in the signal component forms indicated at 23 for the resistive voltage component and at 24 for the inductive voltage component, without deletion from the composite signal of any of the inductive voltage effects. By synchronous rectification, alternate half-cycles of the feedback signal are inverted in sign with the result that the resistive signal component of the synchronously rectified signal 27 indicated at 25 is equivalent to the rectified wave form at 23 but, because of the polarity reversals, the inductive voltage component appears in the form indicated at 26. Consequent integration with respect to time of the resistive component 25 yields in integral value proportional to the absolute magnitude of that component while integration over each half-cycle of the inductive voltage component 26 yields an integral value identically equal to zero. Therefore, an error correcting signal E, generated upon integration of the synchronously rectified composite feedback signal 27 will be free of the undesirable inductive voltage effects during the intervals between power inputs to the controlled quantity. The latter intervals are the time periods when error correction information is usable by conventional alternating current power controllers. Pursuant to the error correction signal information, the fractional conduction period for each successive half-cycle of the power source can be increased or decreased as required to correct for the indicated error.

A simplified, inexpensive and effective circuit 10 for error correction signal generation according to this invention comprises the RC integrator network of resistor 30 and capacitor 31, the summing network of resistors 32 and 33, and the synchronous rectifier circuit of vibrator 34. The vibrator, or inverter, 34 is essentially a double-pole double-throw switch having two input electrodes 35 and 36 arranged at opposite sides of a vane 37 moved from contact with terminal 35 to contact with terminal 36 by an electromagnet 38 against a spring bias. The electromagnet is energized through the phase control circuit of capacitor 39 and variable resistor 40, connected at terminals 41, 42 to an alternating current supply synchronized with the external power source 11. After suitable adjustment of the variable resistor 40, the vane 37 will contact input electrode 35 during transmission of the first half-cycles by the external power source and contact input electrode 36 during second half-cycles.

The feedback signal input is to the primary 43 of an input transformer having a center-tapped secondary 44. Opposite ends of the secondary 44 are coupled respectively with electrodes 35 and 36 of switch 34. The center tap 45 may be connected to a reference potential source or to ground as shown.

A positive pulse input to primary 43 will result in the appearance of an equivalent positive pulse at electrode 36 and, simultaneously, of a negative pulse at electrode 35; the converse will occur for a negative pulse input to primary 43. Therefore, when vane 37 is in contact with electrode 36 the switch output on conductor 46 will have the same polarity as the input to primary 43 and when the vane 37 is in contact with the electrode 35 the output on conductor 46 will have the polarity opposite to that of the input to primary 43. When a feedback signal having the form shown at 20 is the input to primary 43 the output on conductor 46 will comprise the components indicated at 25 and 26. Formation of an error correction signal is completed by comparison of the synchronously rectified feedback signal with a reference signal followed by integration of the comparison result.

The comparison is achieved by means of the summing network of resistors 32, 33 connected at a common output terminal 47. When the resistive component 25 of the synchronously rectified feedback signal to resistor 33 from conductor 46 is a series of positive going pulses, the reference signal R input to resistor 32 is chosen as a negative voltage so that the output at terminal 47 (the input to RC integrator 30, 31) is directly proportional to any difference in the comparison. The comparison value (the difference signal voltage at terminal 47) is thereafter continuously integrated by the RC network 30, 31 resulting in a voltage signal on output conductor 48 equivalent to the time integral of the absolute magnitude of error between the reference signal voltage (input to resistor 32) and the resistive voltage component of the feedback signal (input to resistor 33) during utilization periods. This latter voltage wave form (on conductor 48) is the error correction signal indicating, by its magnitude and sign, the correction to be made effective in the controlled quantity 12 in order to equate its actual condition to the desired condition.

FIGURE 2 illustrates a preferred embodiment of this invention in a circuit for the control of resistance welding operations on thin sheet metal workpieces. The functional elements correspond generally to those of FIGURE 1. A conventional welding machine is illustrated schematically by welding electrodes 51 and 52 in contact with a composite workpiece 53. Here, the controlled quantity is the average voltage across workpiece 53 between electrodes 51 and 52. This quantity may be related to an equilibrium workpiece temperature condition as explained in Patent No. 3,068,350, referred to above.

The welding machine acts as an error corrector, ignitron contactor 54 acts as an amplifier, and an external power source is represented by the alternating current mains connected to switch 55. Potential pick-off connections 56, 57 to opposed electrodes 51, 52 represent the feedback elements of FIGURE 1. A reference input element is again illustrated schematically as a potentiometer 58, and an ignitron firing pulse generator 59 serves as transducer for error correction signals. Circuits according to this invention are embodied in the actuating error signal generator combination of a synchronous rectifier 60 and an integrator 61.

As the details of some of these servo system elements, excepting synchronous rectifier 60 and its combination with integrator 61, are fully explained in the above-mentioned copending application, it should be sufficient here to point out only their functions, as follows. Contactor 54 passes current through welding transformer 62 during the portion of each half-cycle of the alternating current power source remaining after the operative ignitron 63 or 64 has been fired. Firing pulse generator 59 generates igniting pulses for the contactor ignitrons at more or less of a phase lag with respect to alternations of the source voltage as a function of the level of a D.C. voltage signal from the actuating error signal generator circuits 60 and 61. The power input to the workpiece 53 is, of course, a function of the lengths of the alternating current pulses transmitted through contactor 54 and welding transformer 62.

Conventional alternating current contactors such as the ignitron contactor 54 are unaffected by control signal values during conduction periods for either ignitron 63 or 64. Once started, conduction by an ignitron is terminable only upon abatement of its anode voltage. Consequently, it is not necessary to suppress control signal disturbances, such as the inductive voltage effects referred to previously, during ignitron conduction periods. The inductive voltage excursions are due to current variations and are concurrent with conduction periods of the contactor ignitrons. Each cycle of an inductive voltage excursion exhibits positive and negative portions of equal area when graphed with respect to time and therefore, the integral with respect to time over each inductive voltage excursion cycle must be zero valued. It will be apparent then that the integral error correction signals generated according to this invention have no component related to inductive voltage effects during the periods when a conventional ignitron contactor action is controllable.

In the preferred actuating error signal generator combination, the synchronous rectifier 60 comprises a transistorized equivalent of the double-pole, double-throw switch (alternator 34) of FIGURE 1 and a conventional operational amplifier 61, with a capacitor 65 connected between its input and output terminals, is substituted for the simple RC integrator.

The synchronous rectifier 60 is unique in that double-pole, double-throw switching is provided for a pair of valve circuits comprising p-n-p transistor pairs 66–67 and 68–69. The transistors of each pair have a common base and a common emitter circuit and one of two similar biasing transformer secondaries 70, 71 is connected therebetween. Transformer secondaries 70, 71 are wound so that induced secondary voltages are 180° out of phase with each other. A common primary 72 for the secondaries 70, 71 is coupled through a phase shift network comprising resistor 73 and capacitor 74 to an alternating current source at terminals 75 and 76. The phase shift network is adjusted to synchronize the voltage wave form impressed upon primary 72 with the voltage wave form impressed upon workpiece 53.

During the half-cycle when the primary 72 is polarized as indicated, the common base circuit of transistor pair 66–67 is biased positively with respect to the common emitter circuit of that pair, the transistors 66–67 are nonconducting, and there is, in effect, an open circuit between input terminal 77 and output terminal 78. Simultaneously, the converse forward bias condition exists for transistors 68–69 for which conduction is indicated by the shade lines, and there is, in effect, a closed circuit between input terminal 79 and the output terminal 78. During the succeeding half-cycle of the input to primary 72 the above conditions are reversed—terminals 77 and 78 are coupled for signal transmission therebetween and terminals 79 and 78 are decoupled.

While this transistorized switch is the functional equivalent of the vibrator of FIGURE 1, it is preferred because of decreased transfer time (less than 100 microseconds as compared with about 500 microseconds for the vibrator) and also because it is significantly less expensive.

An alternative system position for the reference signal generator 58 is illustrated in the FIGURE 2 embodiment. The reference input is to the mid-tap 80 of input transformer secondary 81. This position for the reference signal input obviates a summing network for comparison of the reference and feedback signals. The polarity of the reference voltage is chosen opposite to the polarity of the synchronously rectified resistive voltage component of the feedback signal. Selection of the reference signal voltage is readily accomplished by means of the manually adjustable tap 82 on the potentiometer 58.

FIGURE 3 illustrates another preferred embodiment of this invention in a circuit for the control of resistance welding operations on thin sheet metal workpieces. This embodiment is substantially similar to the embodiment of FIGURE 2 and the same reference numerals, with the addition of the reference letter "a," are used to identify corresponding parts. The parts of the FIGURE 3 circuit which have counterparts in the FIGURE 2 circuit will not be further described in detail because repetition of the description thereof is believed unnecessary.

This embodiment differs from the FIGURE 2 embodiment principally in the circuitry for energizing the primary winding 72a of the transformer. Here the primary 72a has a center tap 85 which is connected to the positive terminal 91 of a source of D.C. potential of suitable value, such as 18 v. The ends of the primary 72a are respectively connected to the collectors of a pair of transistors 92 and 93 which are connected so as to form a flip-flop or bistable multivibrator circuit 94 of conventional form. In use, one of the aforesaid transistors will be conductive and the other will be nonconductive. The conductive conditions of the transistors 92 and 93 can be reversed by supplying a triggering pulse thereto as hereinafter further described. Current flows from the terminal 91 through one or the other of the halves of the transformer primary winding 72a through the conductive transistor of the multivibrator circuit 94. Thus, operation of the circuit 94 provides a square wave energy flow alternately through the respective halves of the primary winding 72a.

Triggering of the bistable multivibrator circuit 94 is effected by pulses applied at the junction points 96 and 97. The junction points 96 and 97 are connected through diodes 98 and 99 to the bases of the transistors 92 and 93, respectively. A source of A.C. potential of suitable value, such as, for example 24 v., is connected to the terminals 101 and 102 and said terminals are connected through diodes 103 and 104, respectively, to the junction points 96 and 97 so that half-waves of positive potential appear alternately at said junction points. The junction points 96 and 97 are connected through diodes 106 and 107 and conductors 108 and 109 to ground, the diodes being sensed so that current flows from said junction points to ground.

Positive triggering pulses are supplied, as described below, to the junction point 111 which is connected to the conductors 108 and 109. When a pulse occurs it blocks flow of current through the diodes 106 and 107 and has the effect of raising the potential level at whichever one of the junction points 96 and 97 is currently receiving a half-wave of positive potential from the A.C. source. Thus, the occurrence of a triggering pulse at point 111 effects the supply of a firing pulse to the multivibrator circuit 94 so that the previously conductive transistor becomes nonconductive and the previously nonconductive transistor becomes conductive.

The junction point 111 is connected by a conductor 112 to the output conductor 113 of the firing pulse generator 59a, which also supplies the pulses controlling the operation of the contactor 54. Thus, triggering pulses are supplied to the multivibrator circuit 94 at the same time that the contactor 54 is energized to effect flow of weld current so that the operation of the synchronous rectifier, comprising the transistor pairs 66a–67a, 68a–69a is synchronized with the flow of weld current.

In operation, when one of the transistors 92 and 93 is conductive, one of the halves of the primary winding 72a will be polarized to bias one of the transistor pairs 66a–67a, 68a–69a conductive, whereby either terminal 77a or terminal 79a will be connected to output terminal 78a. When a triggering pulse is supplied to the multivibrator circuit 94, the other transistor pair will be rendered conductive so that the other one of the terminals 77a and 79a will be connected to the output terminal 78a. The operation of the rest of the circuit will be the same as previously discussed with respect to the FIGURE 2 circuit and, hence, it need not be further described.

Various substitutions and modifications in the circuits of this invention will be apparent to those skilled in the art and it should be noted, therefore, that this invention is not to be restricted by the illustration and explanation of specific embodiments.

What is claimed is:

1. An error correction signal generator comprising:
   a transformer having a primary winding energized by a cyclic feedback signal in the form of discontinuous, alternate polarity segments, said transformer having secondary winding means;
   switching means having a pair of input terminals and an output terminal, the input terminals being connected to said secondary winding means so that the feedback signal appears thereacross;
a cyclic potential source, said source and said feedback signal being synchronized;
means responsive to said cyclical potential source for alternately coupling said output terminal with said input terminals on alternate segments of the feedback signal; and
an integrator coupled with said output terminal to generate said error correction signal.

2. An error correction signal generator for alternating current servo systems controlling the potential across a variable resistance comprising:
a transformer having a primary for connection in parallel with said variable resistance and a center-tapped secondary and means providing a return path coupled to the center tap of said secondary;
a double-pole, double-throw switch having an output terminal and first and second input terminals each connected with an opposite end of the transformer secondary;
means alternately coupling said output terminal with one of said first and second input terminals; and
an integrator coupled with said output terminal of the switch to generate said error correction signal.

3. The error correction signal generator of claim 2 in which:
said double-pole, double-throw switch comprises transistors having first and second conduction paths between said input terminals and said output terminal;
means alternately biasing said transistors of one path for conduction and said transistors of the other path against conduction; and
a reference voltage source connected to said center tap.

4. An error signal generator comprising:
means for supplying a cyclic feedback signal across a pair of input terminals;
a pair of valve circuits connected between the respective input terminals and an output terminal;
a transformer having primary winding means and secondary winding means, said secondary winding means connected to said valve circuits for effecting alternate conduction thereof on alternate half-cycles of said feedback signal;
means including a bistable multivibrator circuit connected to said primary winding means for supplying a square wave alternating polarity supply of electrical energy to said primary winding means whereby said valve circuits are rendered conductive alternately during alternate half-cycles of the square wave supply;
means for generating triggering pulses connected to said multivibrator circuit;
means for supplying said triggering pulses in synchronism with said cyclic feedback signal to control the square wave energy supply to said primary winding means; and
an integrator coupled with said output terminal to generate said error signal.

5. A welding circuit comprising:
a source of constant potential;
a welding transformer;
a contactor for controlling the supply of welding energy to said welding transformer;
a firing pulse generator for supplying firing pulses to said contactor;
means connected across the secondary of said welding transformer for providing a feedback signal proportional to the series resistance across the welding position, said feedback signal comprising discontinuous alternate polarity segments having an inductive voltage component and a resistive voltage component, which segments correspond to the portions of the alternate half-cycles during which welding current flows;
a pair of input terminals across which said feedback signal appears;
a pair of valve circuits each coupled with one of said input terminals and both being coupled with a single output terminal;
a bistable multivibrator circuit;
a control transformer having secondary winding means connected to said valve circuits for rendering same conductive during alternate half-cycles of the weld current, the ends of the primary of said control transformer being connected to the respective valves of said bistable multivibrator circuit and a center tap on said primary connected to said source of constant potential whereby square wave electrical energy is supplied alternately to the respective valves of said primary;
a trigger circuit for supplying triggering pulses to said multivibrator circuit including means connected to said firing pulse generator for supplying firing pulses to said trigger circuit simultaneously with the supply of firing pulses to said contactor;
means in said trigger circuit for supplying trigger pulses to said multivibrator circuit when a firing pulse is supplied to said trigger circuit; and
an integrator coupled with said output terminal and also coupled with said firing pulse generator for integrating the output signal appearing at said output terminal with respect to time whereby an error correction signal proportional to the absolute magnitude of the series resistance of the welding position is supplied to the firing pulse generator.

References Cited

UNITED STATES PATENTS

| | | | |
|---|---|---|---|
| 2,355,453 | 8/1944 | Livingston | 323—19 X |
| 2,472,041 | 5/1949 | Davies | 323—24 X |
| 2,472,043 | 5/1949 | Callender | 219—110 X |
| 2,486,552 | 11/1949 | Callender | 219—110 |
| 2,848,595 | 8/1958 | Van Sciver | 219—108 |
| 2,996,604 | 8/1961 | Lemson et al. | 219—110 |
| 3,056,017 | 9/1962 | Peras | 219—114 |
| 3,068,350 | 12/1962 | Archer | 219—110 |
| 3,094,608 | 6/1963 | Archer | 219—110 |

JOHN F. COUCH, *Primary Examiner.*

W. E. RAY, W. H. BEHA, *Assistant Examiners.*